(12) United States Patent
Lee et al.

(10) Patent No.: US 12,452,112 B2
(45) Date of Patent: Oct. 21, 2025

(54) WIRELESS COMMUNICATION DEVICE AND OPERATING METHOD OF THE SAME

(71) Applicant: SAMSUNG ELECTRONICS CO., LTD., Suwon-si (KR)

(72) Inventors: Jaehwan Lee, Suwon-si (KR);
Hwanmin Park, Suwon-si (KR);
Kyunghoon Won, Suwon-si (KR);
Huiwon Je, Suwon-si (KR);
Hyunseung Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 484 days.

(21) Appl. No.: 18/153,109

(22) Filed: Jan. 11, 2023

(65) Prior Publication Data

US 2023/0231749 A1    Jul. 20, 2023

(30) Foreign Application Priority Data

Jan. 18, 2022   (KR) .................. 10-2022-0007449
Jun. 13, 2022   (KR) .................. 10-2022-0071727

(51) Int. Cl.
*H04L 25/03* (2006.01)
*H04B 1/7097* (2011.01)
*H04B 1/715* (2011.01)
*H04W 24/02* (2009.01)

(52) U.S. Cl.
CPC .............. *H04L 25/03993* (2013.01)

(58) Field of Classification Search
None
See application file for complete search history.

(56) References Cited

U.S. PATENT DOCUMENTS

| | | | |
|---|---|---|---|
| 6,944,434 B2 | 9/2005 | Mattellini et al. | |
| 8,126,099 B2 | 2/2012 | Wu et al. | |
| 8,280,332 B2 | 10/2012 | Lee et al. | |
| 8,805,315 B2 | 8/2014 | Lee et al. | |
| 8,831,147 B1 * | 9/2014 | Jacob ............... | H04L 25/08 455/119 |
| 8,867,676 B2 | 10/2014 | Cairns | |
| 8,982,701 B2 | 3/2015 | Wigren | |
| 9,307,420 B2 | 4/2016 | Wigren et al. | |

(Continued)

FOREIGN PATENT DOCUMENTS

| | | |
|---|---|---|
| KR | 10-1524747 B1 | 6/2015 |
| KR | 10-1568717 B1 | 11/2015 |

(Continued)

*Primary Examiner* — Duc T Duong
(74) *Attorney, Agent, or Firm* — Sughrue Mion, PLLC

(57) ABSTRACT

A wireless communication device is provided. The wireless communication device includes: a communication circuit configured to transceive a signal using a plurality of antennas; a processor configured to: detect a first interference for N resource blocks (RB) of the signal; based on the first interference being detected, perform a first whitening validation on the first interference; detect a second interference based on a result of the first whitening validation; and based on the second interference being detected, perform a second whitening validation on the second interference; and a whitening filter circuit configured to perform whitening filtering on results of the first whitening validation and the second whitening validation.

20 Claims, 12 Drawing Sheets

(56) References Cited

U.S. PATENT DOCUMENTS

| | | |
|---|---|---|
| 9,686,069 B2 | 6/2017 | Chen et al. |
| 10,616,898 B2 | 4/2020 | Je et al. |
| 2013/0107805 A1* | 5/2013 | Luo .................. H04L 25/03891 |
| | | 370/328 |
| 2013/0156139 A1 | 6/2013 | Lee et al. |
| 2018/0070365 A1* | 3/2018 | Je .......................... H04L 5/0073 |
| 2020/0395985 A1 | 12/2020 | Kwon et al. |
| 2022/0318598 A1* | 10/2022 | Chaudhari ............... H04B 7/08 |

FOREIGN PATENT DOCUMENTS

| | | | |
|---|---|---|---|
| KR | 10-2018-0027968 A | 3/2018 | |
| WO | WO-2006067258 A1 * | 6/2006 | ....... H04L 25/03012 |

\* cited by examiner (a)

WIRELESS COMMUNICATION DEVICE AND OPERATING METHOD OF THE SAME

CROSS-REFERENCE TO RELATED APPLICATIONS

This application is based on and claims priority under 35 U.S.C. § 119 to Korean Patent Application Nos. 10-2022-0007449, filed on Jan. 18, 2022, and 10-2022-0071727, filed on Jun. 13, 2022, in the Korean Intellectual Property Office, the disclosures of which are incorporated by reference herein in their entireties.

BACKGROUND

The present disclosure relates to a wireless communication device and an operating method of the wireless communication device, and more particularly, to a wireless communication device configured to detect an interference signal in a wireless communication system and mitigate the interference signal, based on validation, and an operating method of the wireless communication device.

Recently, with rapid development of wired/wireless communication technology and smart device-related technology, the need for a wireless communication device, which improves transmission/reception performance by reducing influence of interference in signals to provide stable communication between a user device, an external device, and/or a base station in a wireless communication system, has also increased.

In particular, because information about causes or related information about the causes is rare, a direct removal of most of the interference is difficult. Accordingly, symbol detection performance is considerably weakened. A maximum likelihood (ML) symbol detection method, generally known for its good performance, may ensure optimal transmission/reception performance of wireless communication devices by eliminating interference in situations with only white noise. However, in a real wireless communication environment, because there is colored noise including interference in addition to white noise, there is an issue that deterioration of the transmission/reception performance of a wireless communication device may not be prevented. To solve the issue, a whitening filter method is available as a representative interference mitigation method.

In the case of the whitening filter method, the transmission/reception performance of the wireless communication device may be improved by converting colored noise into white noise and removing the white noise. However, when the whitening filter method is used in an environment with no interference or relatively little interference, there is an issue that system complexity may be increased without improving the transmission/reception performance.

Thus, there is a need for a wireless communication device which adaptively removes interference with respect to the detected interference according to the wireless communication environment.

SUMMARY

One or more example embodiments provide a wireless communication device configured to adaptively remove interference by performing validation on detected interference.

One or more example embodiments provide an operating method of a wireless communication device configured to adaptively remove interference by performing validation on detected interference.

Technical issues addressed by the present disclosure are not limited to the above-mentioned issues, and other technical issues not mentioned above may be clearly understood by one of ordinary skill in the art from the following descriptions.

According to an aspect of an example embodiment, there is provided a wireless communication device including: a communication circuit configured to transceive a signal using a plurality of antennas; a processor configured to: detect a first interference for N resource blocks (RB) of the signal; based on the first interference being detected, perform a first whitening validation on the first interference; detect a second interference based on a result of the first whitening validation; and based on the second interference being detected, perform a second whitening validation on the second interference; and a whitening filter circuit configured to perform whitening filtering on results of the first whitening validation and the second whitening validation.

According to an aspect of an example embodiment, there is provided an operating method of a wireless communication device including a plurality of antennas configured to transceive a signal including: detecting a first interference for N resource blocks (RB) of the signal; based on the first interference being detected, performing a first whitening validation on the first interference; detecting a second interference, based on a result of the first whitening validation; based on the second interference being detected, performing a second whitening validation on the second interference; and performing whitening filtering according to results of the first whitening validation and the second whitening validation.

According to an aspect of an example embodiment, there is provided an electronic device including: a communication circuit configured to transceive a signal using a plurality of antennas; a processor configured to: detect a first interference for N resource blocks (RB) of the signal; based on the first interference being detected, perform a first whitening validation on the first interference; detect a second interference, based on a result of the first whitening validation; and based on the second interference being detected, perform a second whitening validation on the second interference; a whitening filter circuit configured to perform whitening filtering according to results of the first whitening validation and the second whitening validation; and a whitening control circuit configured to change at least one threshold value related to detection of the first interference and the second interference, based on a remaining battery charge of the electronic device, the first whitening validation, and the second whitening validation.

BRIEF DESCRIPTION OF DRAWINGS

The above and other aspects and features will be more apparent from the following description of example embodiments taken in conjunction with the accompanying drawings, in which:.

DETAILED DESCRIPTION

Hereinafter, example embodiments will be described with reference to the accompanying drawings. Each example embodiment provided in the following description is not excluded from being associated with one or more features of another example or another example embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
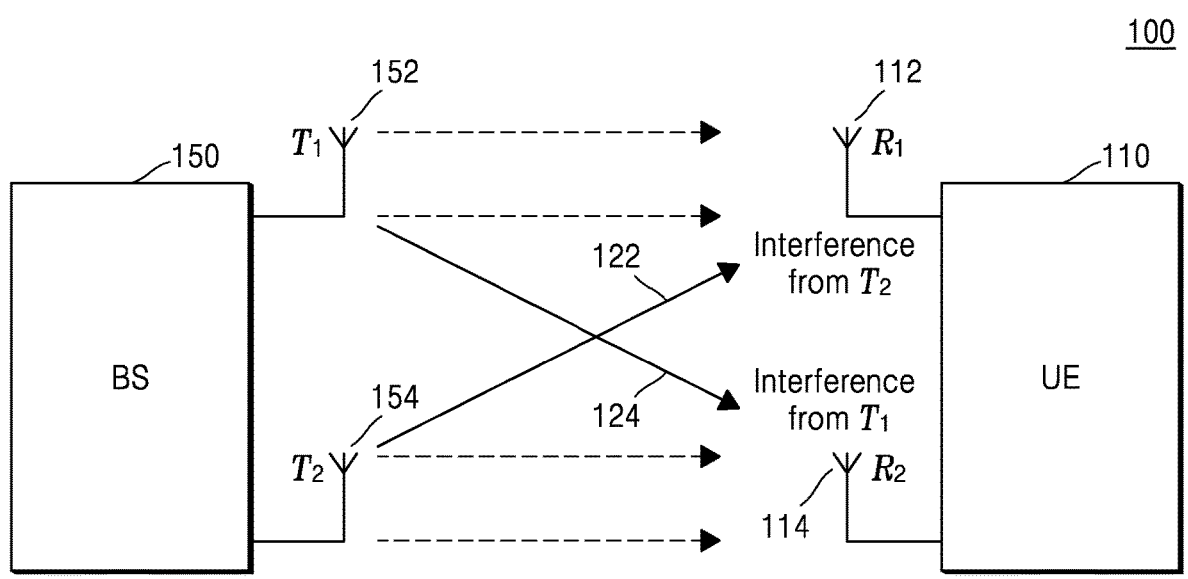
FIG. 1 illustrates an example of interference received by devices in a wireless communication system, according to an example embodiment.

FIG. 1 illustrates an example of interference received by devices in a wireless communication system 100, according to an example embodiment.

Referring to FIG. 1, the wireless communication system 100 may include a user equipment (UE) 110 and a base station (BS) 150.

The UE 110 may, as a wireless communication device, include a plurality of antennas. At least some of the plurality of antennas may correspond to reception antennas (for example, $R_1$ 112 and $R_2$ 114). For example, a first reception antenna ($R_1$) 112 and a second reception antenna ($R_2$) 114 may receive wireless signals from an external device (for example, another terminal or another BS) other than the UE 110. The plurality of antennas may also include transmission antennas.

In this case, spatially correlated interference may include interference generated by the neighboring BS 150 or other neighboring wireless communication devices (for example, other terminal devices). Spatially correlated interference may be one of the factors that degrades the wireless communication performance of the UE 110, by adding an undesired signal to a received signal, amplifying the power of the received signal, and affecting the overall and/or some bandwidths of the wireless communication system 100. For example, in the $R_1$ 112 of the user device 110, reception power of an original signal may be amplified and modified by a first spatially correlated interference 122 received from a second transmission antenna ($T_2$) 154 of the BS 150. In the $R_2$ 114 of the UE 110, the reception power of the original signal may be amplified and modified by a second spatially correlated interference 124 received from a first transmission antenna ($T_1$) 152 of the BS 150.

In the wireless communication system 100, the UE 110 may perform wireless communication with an external device (for example, the BS 150), based on a particular frequency band among a plurality of frequency bands. For example, the UE 110 may select a particular frequency band to communicate with the BS 150, and detect a signal transmitted from the BS 150 after selective frequency filtering for the selected particular frequency band.

In this case, the selective frequency filtering may cause distortion of signals at boundaries of the frequency band due to using a replacement filter (for example, a sinc function-shaped analog baseband filter) because of a design limitation of an ideal frequency filter (for example, a rectangular filter). The interference caused by the distortion may be referred to as frequency selective interference.

In the wireless communication system 100, the spatially correlated interference and the frequency selective interference described above may, as unexpected interferences, be factors, which degrade the wireless communication performance of the UE 110. Recently, the UE 110 may ensure the wireless communication performance by removing the interferences, by performing whitening filtering on the spatially correlated interference and frequency selective interference.

However, when the whitening filtering is unconditionally performed in a situation where there is no or less spatially correlated interference and frequency selective interference, the overall system performance of the UE 110 may be degraded due to an increase in the system complexity, rather than improving the wireless communication performance. This may be because the whitening filtering is a process of converting colored noise including interference into white noise, and requires computations, which generate significant workload on a system, as its essential operation.

Accordingly, in an example embodiment, there is provided a wireless communication device, which, after detecting interference in a wireless communication environment, adaptively performs whitening filtering by performing validation for determining whether the interference requires performing of the whitening filtering, and an operation method thereof.

Figure 2:
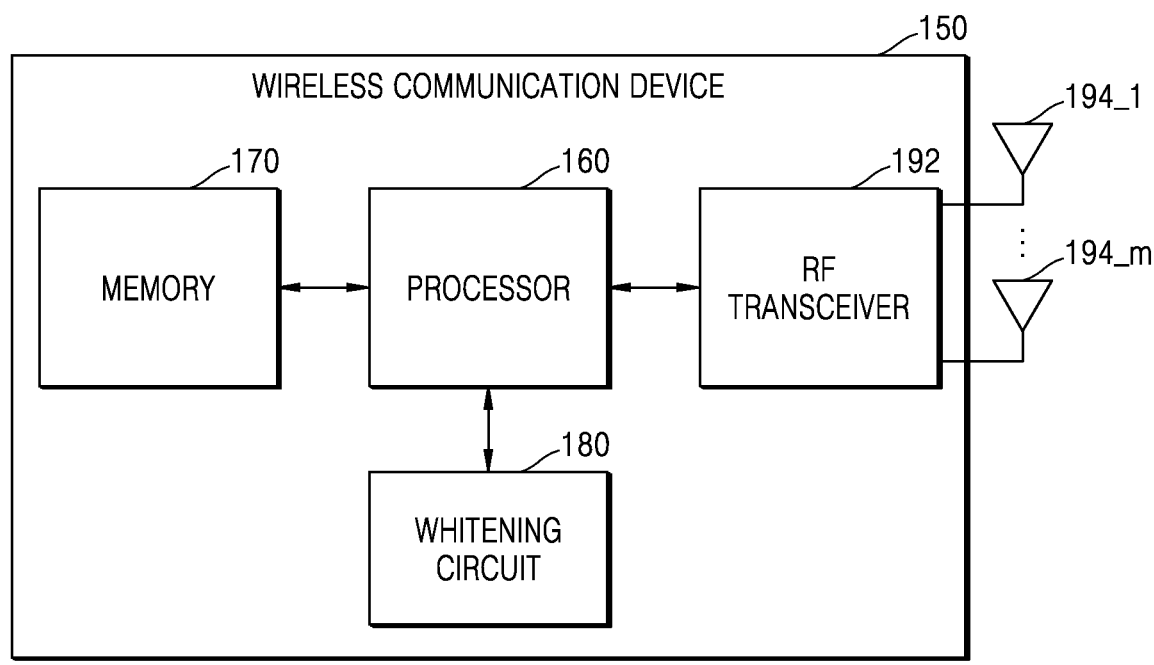
FIG. 2 is a block diagram of a wireless communication device according to an example embodiment.

FIG. 2 is a block diagram of a wireless communication device 150 according to an example embodiment.

Referring to FIG. 2, the wireless communication device 150 may include a processor 160, a memory 170, a whitening circuit 180, a radio frequency (RF) transceiver 192, and a plurality of antennas 194_1 through 194_m.

The RF transceiver 192 may receive RF signals transmitted by a serving cell via the plurality of antennas 194_1 through 194_m. The RF transceiver 192 may generate an intermediate frequency or baseband signals by performing down-conversion on the received RF signals. The whitening circuit 180 may generate data signals by filtering, decoding, and/or digitizing the intermediate frequency or baseband signals. The processor 160 may additionally process the data signals.

In addition, the RF transceiver 192 may receive the data signals from the processor 160. The RF transceiver 192 may encode, multiplex, and/or convert the received data signals into an analog form. The processor 160 may generate intermediate frequency or baseband signals. The RF transceiver 192 may perform frequency up-conversion on the intermediate frequency or baseband signals output from the processor 160, and transmit the up-converted intermediate frequency or baseband signals as RF signals via the plurality of antennas 194_1 through 194_m.

The memory 170 may store an operating system, and may also store an application and/or a process register including device drivers, executable libraries, and/or program code. The operating system and the application may, as software components, be implemented by executing code and/or instructions by using the processor 160. For example, the memory 170 may store the operating system, the application and/or the process register in the form of program code, which is executed to perform a detection operation on a first interference and/or a second interference, and a whitening validation operation on the first interference and/or second interference, according to example embodiments.

The processor 160 may control the wireless communication device 150 for wireless network-based communication, and may perform detection or whitening validation operations on the first interference and the second interference by using a signal received from an external device.

For example, the processor 160 may detect interference by using a maximum value of cross-correlation ratios with respect to auto-correlation caused by different antennas among a plurality of antennas, or a noise power variance value for a resource block (RB), for which no interference has been detected.

The processor 160 may execute a program and/or process stored in the memory 170 to perform a control operation on the wireless communication device 150 overall. In some example embodiments, the processor 160 may be stored in the memory 170 in the form of program code executed to perform a detection operation or a whitening validation operation on the first interference or the second interference according to example embodiments, and the processor 160 may, by accessing the memory 170 and executing the stored program code, perform the detection operation or the whitening validation operation on the first interference and the second interference. Detailed descriptions thereof are given below with reference to FIGS. 4 through 7.

In addition, the processor 160 may perform adaptive whitening filtering by changing threshold values related to the interference detection and the whitening validation according to the performance (for example, remaining charge amount) of the wireless communication device 100. Detailed descriptions thereof are given below with reference to FIGS. 9A, 9B, 9C, 9D and 9E.

The whitening circuit 180 may include a whitening filter circuit. The whitening circuit 180 may convert colored noise into white noise by using the whitening filter circuit. The colored noise may be referred to as noise including the spatially correlated interference and the frequency selective interference. For example, the whitening circuit 180 may estimate a noise covariance matrix, convert the colored noise into the white noise, and then mitigate the interference. Accordingly, the performance of the ML symbol detection method may be improved.

A wireless communication device according to example embodiments may perform detection and whitening of multi-interference by performing an interference detection operation described below with reference to FIGS. 4 through 7 and a whitening validation operation on the detected interference. In addition, by adaptively performing whitening filtering, based on the performance of a device, wireless communication performance may be improved without incurring excessive overhead on a system.

Accordingly, in a wireless communication system having various interference, a wireless communication device capable of stably transceiving data may be provided. Hereinafter, a detection operation and a whitening validation operation performed on interference are described in detail.

Figure 3:
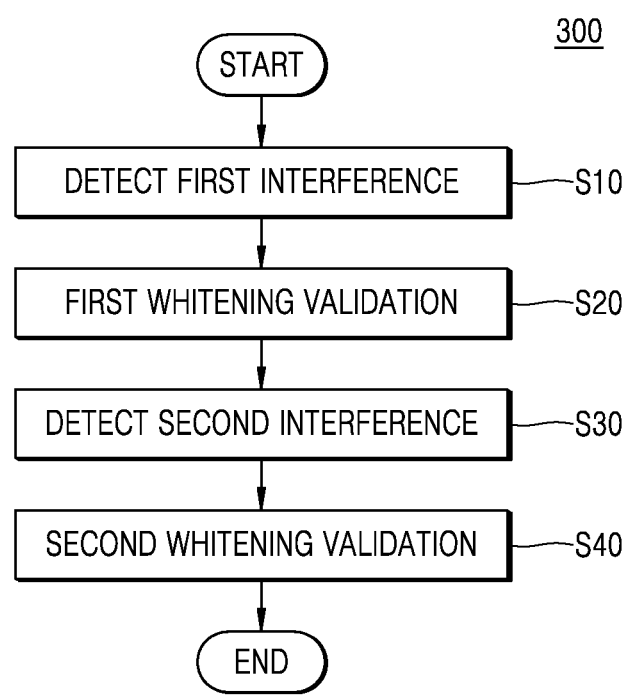
FIG. 3 is a flowchart illustrating an operating method of a wireless communication device, according to an example embodiment.

FIG. 3 is a flowchart 300 illustrating an operating method of a wireless communication device, according to an example embodiment. FIG. 3 is a diagram for describing the interference detection and whitening validation operations performed by the processor 160 of the wireless communication device 150 of FIG. 2.

Referring to FIG. 3, the interference detection and whitening validation operations may include operations S10, S20, S30, and S40.

The processor 160 may detect the first interference (S10). In this case, the first interference may include the spatially correlated interference, which changes the original signal by adding an unwanted signal to the received signal and amplifying power of the received signal.

The processor 160 may detect the first interference per RB, based on a demodulation reference signal (DMRS) or a cell specific reference signal (CRS).

The processor 160 may detect the first interference by using correlation characteristics of noise received by each of the plurality of antennas 194_1 through 194_m included in the wireless communication device 150, based on DMRS or CRS.

In the case of a wireless communication environment with no interference therein, the cross-correlation values between noise received from different antennas may have very small values or values close to about '0' due to the independent characteristics of additive white Gaussian noise (AWGN).

On the other hand, in the case of a wireless communication environment with interference therein, the cross-correlation values between noise received from different antennas may have values that are relatively larger than the cross-correlation values in the case of the wireless communication environment with no interference therein. Accordingly, the processor 160 may detect the first interference by using the noise covariance matrix characteristics.

For example, the processor 160 may detect the first interference, based on the comparison result between the maximum value of ratios of the cross-correlation with respect to the auto-correlation, by using different antennas from each other and the threshold value. Detailed descriptions thereof are given below with reference to FIG. 4.

The processor 160 may perform a first whitening validation on the first interference (S20). The processor 160 may determine whether to perform whitening filtering on the RB, in which the first interference has been detected.

For example, when the first interference is detected in all RBs among a total of N RBs, the processor 160 may determine to perform the whitening filtering on all N RBs. When the first interference has not been detected in any one of the total of N RBs, the processor 160 may determine to skip the whitening filtering on the N RBs. When the first interference is detected in some, but not each, of the total of N RBs, the processor 160 may determine whether to perform the whitening filtering on some RBs, based on an average noise power ratio of the RBs with detected first interference or a ratio of the RBs with detected first interference over the total of N RBs. Detailed descriptions thereof are given below with reference to FIG. 5.

The processor 160 may detect a second interference (S30).

In this case, the second interference may be distortion of a signal generated according to a frequency filtering operation for identifying a particular frequency band used in a communication process with an external device, and may include the frequency selective interference. The second interference may affect the whole frequency band.

The processor 160 may calculate average noise power for each antenna of the RBs, in which the first interference is not detected, based on the result of the first whitening validation.

The processor 160 may detect the second interference, based on a comparison result between the average noise power of each antenna and a threshold value of the RBs, in which the calculated first interference has not been detected. Detailed descriptions thereof are given below with reference to FIG. 6.

The processor 160 may perform the second whitening validation on the second interference (S40). The processor 160 may determine whether to perform the whitening filtering on the RB, in which the second interference has been detected.

For example, when the second interference is detected in the RBs, for which the whitening filtering has been determined to be skipped (determined in operation S20), the processor 160 may change the determination to perform the whitening filtering on the RBs, for which interference (that is, the first and/or second interference) has been detected.

For example, when the second interference has not been detected in the RBs, for which the whitening filtering has been determined to be skipped (determined in operation S20), the processor 160 may change the determination to skip the whitening filtering for the RBs, for which interference (that is, the first and/or second interference) has been detected. Detailed descriptions thereof are given below with reference to FIG. 7.

Figure 4:
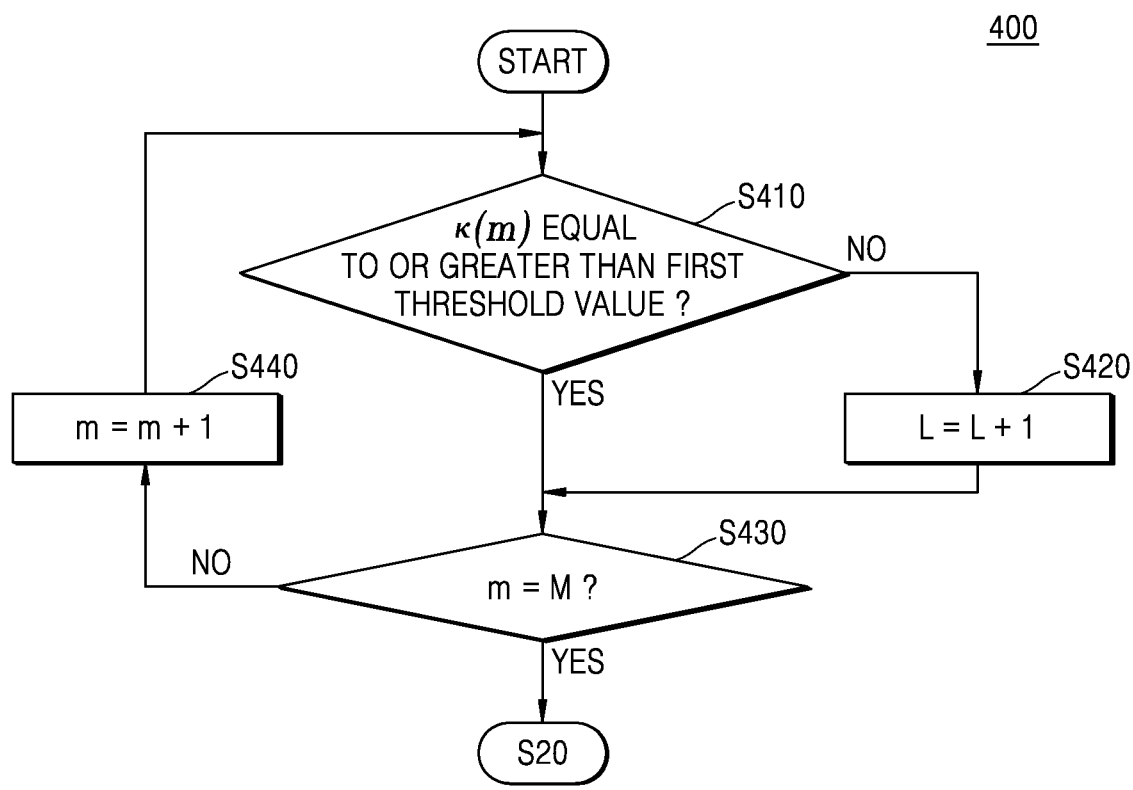
FIG. 4 is a flowchart illustrating an operation of detecting a first interference, according to an example embodiment.

FIG. 4 is a flowchart 400 illustrating an operation of detecting the first interference, according to an example embodiment. FIG. 4 is a diagram for describing the first interference detection performed by the processor 160 of the wireless communication device 150 of FIG. 2, and corresponds to the operation S10 of FIG. 3.

In this case, the first interference may include interference received from an adjacent base station BS or other periphery wireless communication devices in a wireless communication system, and may be referred to as spatially correlated interference.

Referring to FIG. 4, the first interference detection operation may include operations S410, S420, S430, and S440.

In operation S410, the processor 160 may identify whether the maximum value ($\kappa(m)$) of a ratio of the cross-correlation value with respect to an auto-correlation value of noise received from different antennas is equal to or greater than a first threshold value. In this case, $\kappa(m)$ may be calculated according to Formula 1 below.

$$\max_{1 \leq i \leq n_r, j > i} \frac{\hat{R}_{ij}(m)}{\hat{R}_{ii}(m)\hat{R}_{jj}(m)} = \kappa(m) \quad [\text{Formula 1}]$$

In this case, $\hat{R}_{ij}(m)$ may indicate a value at a location of an ith row and a jth column of an estimated noise covariance matrix ($\hat{R}(m)$). $\kappa(m)$ may be the ratio of the cross-correlation value with respect to the auto-correlation value, and may have robust characteristics even when an absolute covariance value changes due to signal scaling of the wireless communication system.

For example, when $\kappa(m)$ is equal to or greater than the first threshold value, the processor 160 may detect the first interference in the RB of the received signal. The processor 160 may perform operation 430, based on the first interference being detected in the RB of the received signal. When $\kappa(m)$ is equal to or less than the first threshold value, the processor 160 may determine the first interference has not been detected in the RB of the received signal. The processor 160 may perform operation 430, based on identifying that the first interference has not been detected in the RB of the received signal.

The processor 160 may increase the value of a variable L by '1' and store the result therein (S420). In this case, the variable L may be an integer equal to or greater than about 0, and may indicate the number of RBs, in which the first interference has not been detected.

The processor 160 may identify whether an index m of the current RB is equal to a number M of all RBs of the received signal (S430). In this case, the index m may be an integer equal to or greater than 0 and equal to or less than the number M ($0 \leq m \leq M$).

For example, when the index m of the current RB is equal to the number M of all RBs of the received signal, the processor 160 may perform operation S20 in FIG. 3, based on identifying that the first interference detection operation has been completed on all the RBs of the received signal.

For example, when the index m of the current RB is not equal to the number M of all RBs of the received signal, the processor 160 may perform operation S440, based on identifying that the first interference detection operation has not been completed on all the RBs of the received signal.

The processor 160 may increase the value of the index m by '1' and store the result therein (S440).

For example, the processor 160 may obtain the index m of a next RB by increasing the index m of the current RB by "1", as a preliminary operation for performing the first interference detection operation on the next RB.

Figure 5:
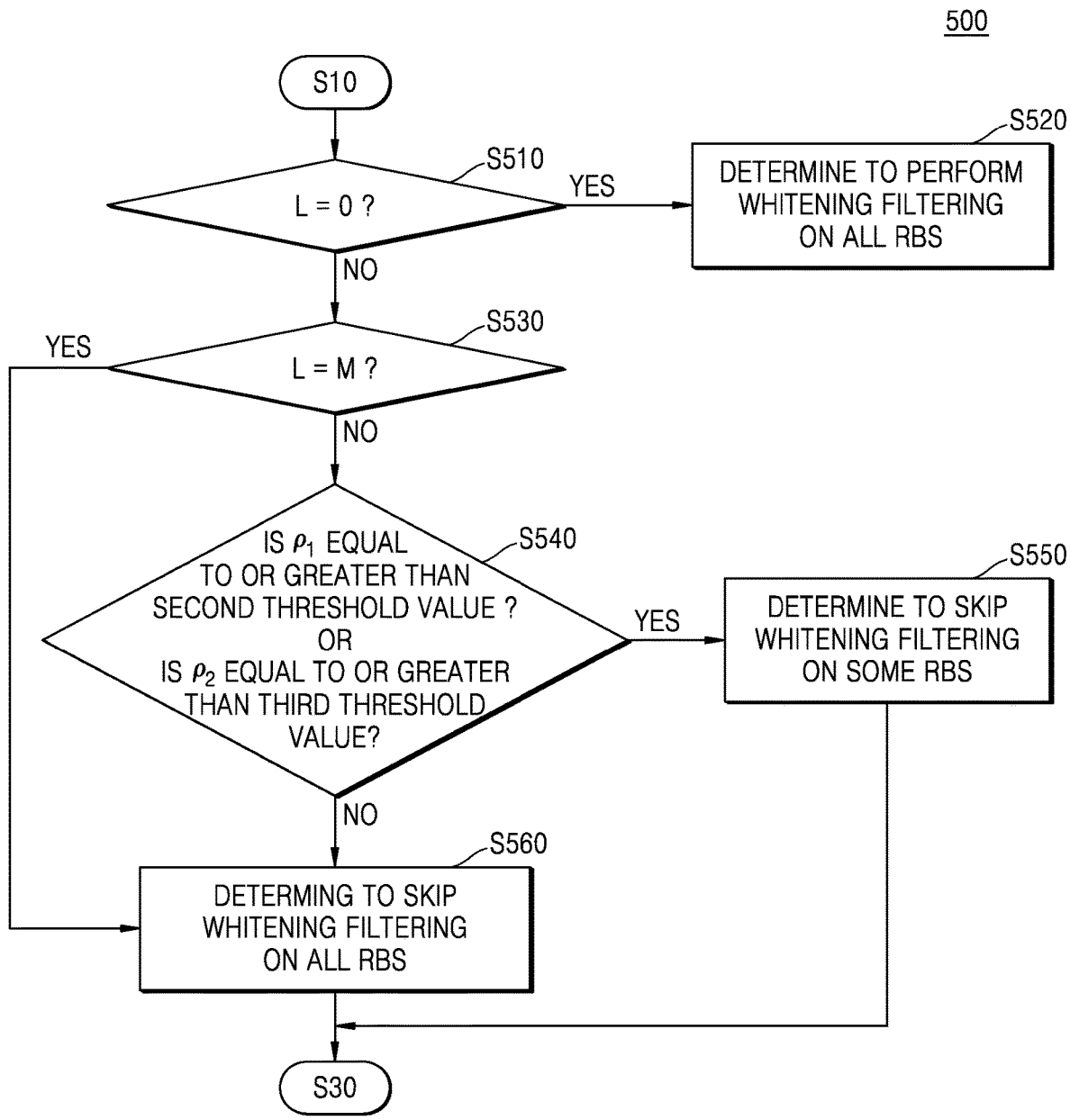
FIG. 5 is a flowchart illustrating an operation of performing validation on a first interference, according to an example embodiment.

FIG. 5 is a flowchart 500 illustrating an operation of performing validation on a first interference, according to an example embodiment. FIG. 5 is a diagram for describing the first whitening validation operation, which is performed by the processor 160 of the wireless communication device of FIG. 2, and determines whether to perform the whitening filtering on the first interference. FIG. 5 corresponds to the operation S20 of FIG. 3

Referring to FIG. 5, the first whitening validation operation may include operations S510, S520, S530, S540, S550 and S560.

The processor 160 may identify whether a number L of RBs, in which the first interference has not been detected, is '0' (S510). In this case, the number L of the RBs, in which the first interference has not been detected, may include an integer equal to or greater than '0' and equal to or less than 'M' ($0 \leq L \leq M$).

The processor 160 may determine whether to perform the whitening filtering on all the RBs of the received signal, according to whether the number L of RBs, in which the first interference has not been detected, is '0'.

For example, when the number L of the RBs, in which the first interference has not been detected, is '0', the processor 160 may perform operation S520.

For example, when the number L of the RBs, in which the first interference has not been detected, is not '0' (i.e., is at least '1'), the processor 160 may identify that the first interference is detected in all the RBs or some RBs of the received signal, and may perform operation S530.

The processor 160 may determine to perform the whitening filtering on all the RBs of the received signal (S520). For example, when the number L of the RBs, in which the first interference has not been detected, is '0', the processor 160 may identify that the first interference has been detected in all the RBs of the received signal, and determine to perform the whitening filtering on all the RBs of the received signal.

The processor 160 may identify whether the number L of the RBs, in which the first interference has not been detected, is equal to the number M of all RBs of the received signal (S530). In this case, the number L of RBs, in which the first interference has not been detected, may include an integer equal to or greater than '0' and equal to or less than the number M (0≤L≤M).

The processor 160 may determine whether to skip the whitening filtering on all the RBs of the received signal, based on whether the number L of RBs, in which the first interference has not been detected, is equal to the number M of the RBs in the received signal.

For example, when the number L of the RBs, in which the first interference has not been detected, is equal to the number M of all RBs of the received signal, the processor 160 may perform operation S560.

For example, when the number L of the RBs, in which the first interference has not been detected, is not equal to the number M of all RBs of the received signal, the processor 160 may identify that the first interference has been detected in some RBs of the received signal, and perform operation S540.

The processor 160 may identify whether the value of a variable $\rho_1$ is equal to or greater than a second threshold value, or the value of a variable $\rho_2$ is equal to or greater than a third threshold value (S540). In this case, the variable $\rho_1$ and the variable $\rho_2$ may be calculated according to Formula 2 and Formula 3 below, respectively.

$$\rho_1 = \frac{\frac{1}{|M-L|}\sum_{m_1 \in \mathcal{M}_1} \frac{1}{n_r}\sum_i \hat{R}_{ii}(m_1)}{\frac{1}{|L|}\sum_{m_2 \in \mathcal{M}_2} \frac{1}{n_r}\sum_i \hat{R}_{ii}(m_2)} \quad \text{[Formula 2]}$$

Here, the variable $\rho_1$ may indicate a ratio of average noise power of the RBs, in which the first interference has been detected, over that of the RBs, in which the first interference has not been detected. $\mathcal{M}_1$ may indicate a set of indexes of the RBs, in which the first interference has been detected, and $\mathcal{M}_2$ may indicate a set of indexes of the RBs, in which the first interference has not been detected. $n_r$ may indicate a vector matrix component of the received signal.

$$\rho_2 = \frac{M-L}{M} \quad \text{[Formula 3]}$$

In this case, $\rho_2$ may indicate a ratio of the number of RBs, in which the first interference has been detected, over the number of all RBs of the received signal. The number L may indicate the number of RBs, in which the first interference has not been detected, and the number M may indicate the total number of RBs of the received signal.

The processor 160 may determine whether to skip the whitening filtering on the RB, in which the first interference has not been detected, based on whether the value of the variable $\rho_1$ is equal to or greater than the second threshold value or the value of the variable $\rho_2$ is equal to or greater than the third threshold value.

For example, when the value of the variable $\rho_1$ is equal to or greater than the second threshold value, or the value of the variable $\rho_2$ is equal to or greater than the third threshold value, the processor 160 may perform operation S550.

For example, when the value of the variable $\rho_1$ is less than the second threshold value or the value of the variable $\rho_2$ is less than the third threshold value, the processor 160 may perform operation S560.

The processor 160 may determine not to apply the whitening filtering to some RBs or to skip the whitening filtering. For example, when the value of the variable $\rho_1$ is equal to or greater than the second threshold value, or the value of the variable $\rho_2$ is equal to or greater than the third threshold value, the processor 160 may determine to skip the whitening filtering on some RBs, in which the first interference has not been detected. In this regard, when the value of the variable $\rho_1$ is equal to or greater than the second threshold value or the value of the variable $\rho_2$ is equal to or greater than the third threshold value, the processor 160 may determine to perform the whitening filtering only on some of the RBs, in which the first interference has been detected.

The processor 160 may determine not to apply the whitening filtering to all RBs or to skip the whitening filtering (S560). For example, when the value of the variable $\rho_1$ is less than the second threshold value or the value of the variable $\rho_2$ is less than the third threshold value, the processor 160 may determine to skip the whitening filtering on all RBs, based on the result of the first whitening validation.

In this case, performance deterioration of a system due to a system overload caused by the whitening filtering on some RBs, in which the first interference has been detected, may be greater than communication performance improvement of the system due to the whitening filtering performed on some of the RBs, in which the first interference has been detected.

Accordingly, the processor 160 may determine to skip the whitening filtering on all RBs, based on the result of the first whitening validation, to prevent the system overload due to the whitening filtering.

Figure 6:
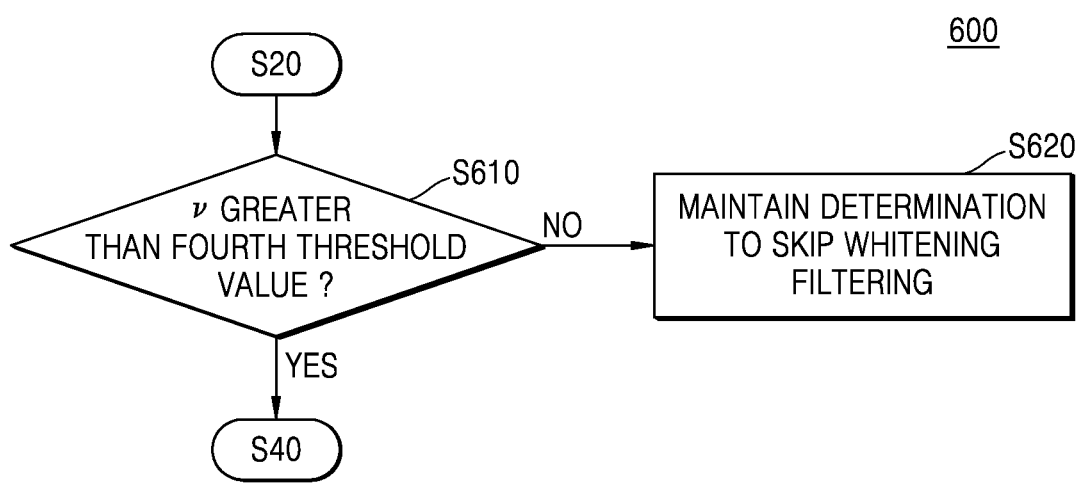
FIG. 6 is a flowchart illustrating an operation of detecting a second interference, according to an example embodiment.

FIG. 6 is a flowchart 600 illustrating an operation of detecting the second interference, according to an example embodiment. FIG. 6 is a diagram for describing the detection operation on the second interference, which is performed by the processor 160 of the wireless communication device 150 of FIG. 2, after the first whitening validation, and corresponds to the operation S30 of FIG. 3.

In this case, the second interference may indicate the frequency selective interference according to distortion of a boundary signal of a frequency band, which is generated according to the selective frequency filtering during a wireless communication process.

Referring to FIG. 6, the operation of detecting the second interference may include operations S610 and S620.

The processor 160 may identify whether a normalized noise power variance value v for the RBs, which are determined to skip the whitening filtering, exceeds a fourth threshold value (S610). In this case, the normalized noise power variance values v for the RBs determined to skip the whitening filtering may be calculated according to Formula 4 below.

$$v = \frac{1}{n_r}\sum_{i \le i \le n_r} \frac{1}{F}\sum_{f \in \mathcal{F}}\left(\frac{\hat{R}_{ii}(f) - M_{ii}}{M_{ii}}\right)^2 \quad \text{[Formula 4]}$$

In this case, $M_{ii}$ may indicate the average noise power received by the ith antenna of the RBs determined to skip the whitening filtering, and may be calculated according to Formula 5 below.

$$M_{ii} = \frac{1}{F} \sum_{f \in \mathcal{F}} \hat{R}_{ii}(f) \qquad \text{[Formula 5]}$$

In this case, a set $\mathcal{F}$ may indicate an index set of the RBs determined to skip the whitening filtering, and F may indicate the size of a set $\mathcal{F}$.

The processor 160 may detect the second interference of the RB of the received signal, based on whether the normalized noise power variance value v for the RBs determined to skip the whitening filtering exceeds the fourth threshold value.

For example, when the normalized noise power variance value v for the RBs determined to skip the whitening filtering exceeds the fourth threshold value, the processor 160 may determine that the second interference has been detected in the RBs of the received signal, and may perform operation S40 in FIG. 3.

For example, when the normalized noise power variance value v for the RBs determined to skip the whitening filtering is equal to or less than the fourth threshold value, the processor 160 may determine that the second interference has not been detected in the RBs of the received signal and may perform operation S620.

The processor 160 may maintain the determination not to apply or to skip the whitening filtering (S620). For example, the processor 160 may maintain the decision to skip the whitening filtering in operations S550 and S560 in FIG. 5, based on identifying that the second interference has not been detected in the RBs of the received signal.

Figure 7:
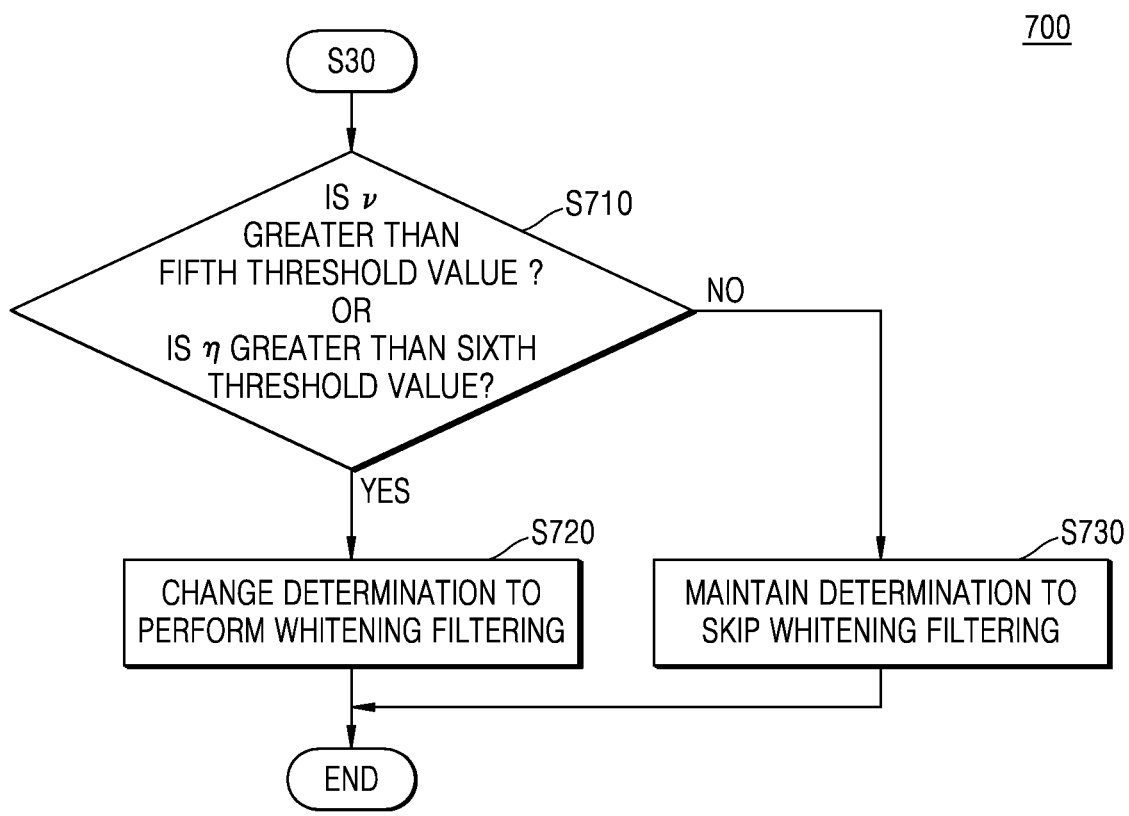
FIG. 7 is a flowchart illustrating an operation of performing validation on a second interference, according to an example embodiment.

FIG. 7 is a flowchart 700 illustrating an operation of performing the validation on the second interference, according to an example embodiment. FIG. 5 is a diagram for describing a second whitening validation operation, which is performed by the processor 160 of the wireless communication device of FIG. 2, and determines whether to perform the whitening filtering on the second interference, and corresponds to the operation S40 of FIG. 3.

Referring to FIG. 7, the second whitening validation operation may include operations S710, S720, and S730.

The processor 160 may identify whether the normalized noise power variance value v of the RBs determined to skip the whitening filtering exceeds a fifth threshold value, or whether a maximum difference value η of the average noise power of the antennas measured for each RB determined to skip the whitening filtering exceeds a sixth threshold value.

In this case, the normalized noise power variance values v for the RBs determined to skip the whitening filtering may be calculated, based on Formulas 4 and 5 described above. The maximum difference value η of the average noise power of the antennas measured for each RB, which has been determined to skip the whitening filtering, may be calculated, based on Formula 6 below.

$$\eta = \max_{f \in \mathcal{F}} \frac{1}{n_r} \sum_{1 \leq i \leq n_r} \hat{R}_{ii}(f) - \min_{f \in \mathcal{F}} \frac{1}{n_r} \sum_{1 \leq i \leq n_r} \hat{R}_{ii}(f) \qquad \text{[Formula 6]}$$

In this case, η may indicate a difference value between a maximum value and a minimum value of the average noise power of the antennas measured for each RB, which has been determined to skip the whitening filtering.

The processor 160 may perform the second whitening validation, based on whether the normalized noise power variance value v of the RBs determined to skip the whitening filtering exceeds the fifth threshold value, or the maximum difference value η of the average noise power of the antennas measured for each RB determined to skip the whitening filtering exceeds the sixth threshold value.

In this regard, the processor 160 may change the decision to skip the whitening filtering in operations S550 and S560 in FIG. 5, according to the result of the second whitening validation.

For example, the processor 160 may perform operation S720, when the normalized noise power variance value v of the RBs determined to skip the whitening filtering exceeds the fifth threshold value, or when the maximum difference value η of the average noise power of the antennas measured for each RB determined to skip the whitening filtering exceeds the sixth threshold value.

For example, the processor 160 may perform operation S730, when the normalized noise power variance value v of the RBs determined to skip the whitening filtering is equal to or less than the fifth threshold value, or when the maximum difference value η of the average noise power of the antennas measured for each RB determined to skip the whitening filtering is equal to or less than the sixth threshold value.

The processor 160 may change the decision to perform the whitening filtering (S720). For example, the processor 160 may change the decision to skip the whitening filtering in operations S550 and S560 in FIG. 5, to a decision to perform the whitening filtering.

In this case, it may be determined that communication performance is degraded due to interference, according to the result of the second whitening validation (operation S710), and that the whitening filtering for the received signal is required for performing stable wireless communication. Accordingly, to ensure wireless communication performance, the processor 160 may change the decision to skip the whitening filtering, to the decision to perform the whitening filtering.

The processor 160 may maintain the determination not to apply or to skip the whitening filtering (S730). For example, the processor 160 may maintain the decision to skip the whitening filtering in operations S550 and S560 in FIG. 5.

In this case, performance degradation of a device due to system overload caused by the whitening filtering is greater than communication performance improvement of the device due to the whitening filtering.

Accordingly, the processor 160 may maintain the determination to skip the whitening filtering with respect to interference (for example, the first interference or the second interference), based on the result of the second whitening validation, to prevent the system overload due to the whitening filtering.

Figure 8:
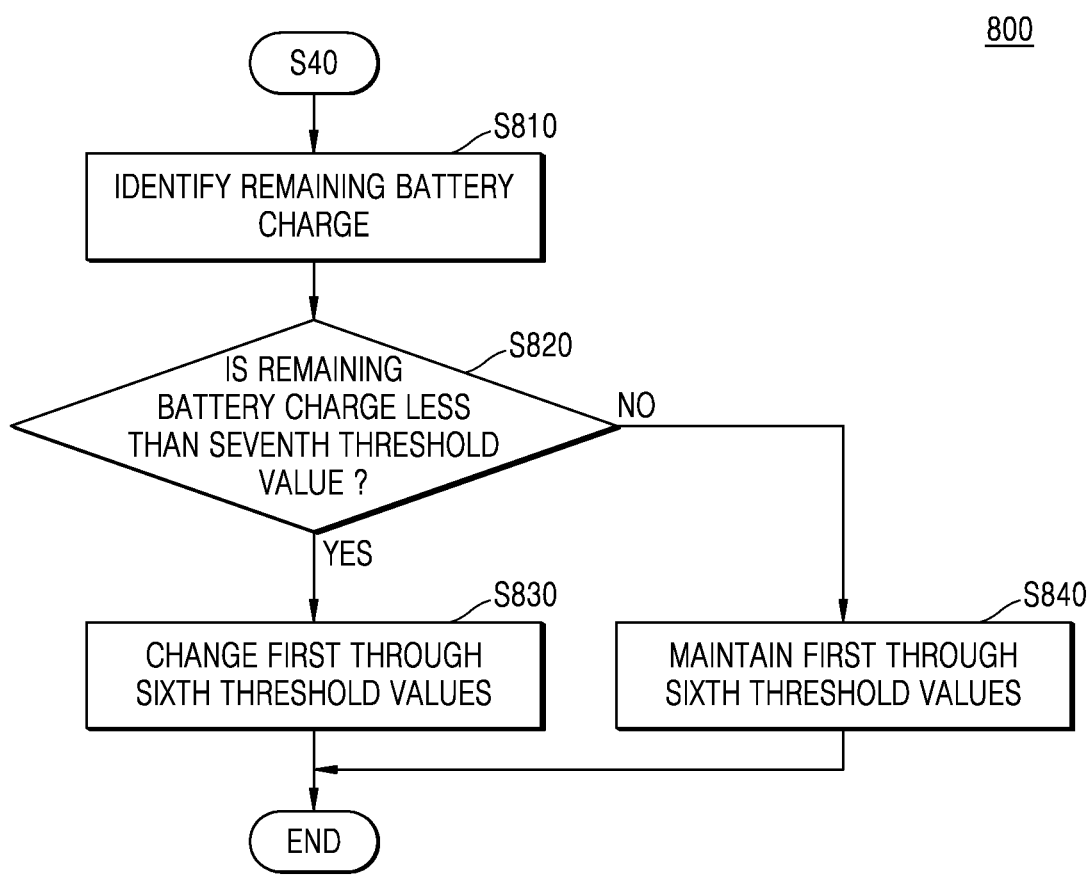
FIG. 8 is a flowchart illustrating an operating method of an electronic device, according to an example embodiment.

FIG. 8 is a flowchart 800 illustrating an operating method of an electronic device, according to an example embodiment. A processor of the electronic device of FIG. 8 may correspond to the processor 160 in the wireless communication device of FIG. 2, and FIG. 8 is a diagram for describing an operation of adjusting a threshold value related to interference detection, the first whitening validation, the second whitening validation, based on the performance of the electronic device.

Referring to FIG. 8, an operation of adjusting a related threshold value, based on the performance of the electronic device, may include operations S810, S820, S830, and S840.

The processor 160 may identify the remaining battery capacity of the electronic device (S810). A battery of the electronic device may include, for example, a non-rechargeable primary battery, a rechargeable secondary battery, or a fuel cell, as a component of supplying power to at least one component of the electronic device.

For example, the processor 160 may obtain the remaining battery information by checking the battery state of the electronic device, by using a protection circuit embedded in a battery pack of the electronic device and a charge gauge circuit inside the processor 160.

The processor 160 may identify whether the identified remaining battery charge is less than a preset seventh threshold value (S820).

The processor 160 may determine whether to apply a battery saving mode to the electronic device, based on whether the identified remaining battery charge is less than the preset seventh threshold value.

For example, when the identified remaining battery charge is less than the preset seventh threshold value, the processor 160 may perform operation S830.

For example, when the identified remaining battery charge is equal to or greater than the preset seventh threshold value, the processor 160 may perform operation S840.

The processor 160 may change the first through sixth threshold values (S830). When the identified remaining battery charge is less than the preset seventh threshold value, the processor 160 may determine the internal state of the electronic device as the battery saving mode.

For example, as the state of the electronic device is determined as the battery saving mode, the processor 160 may increase the first threshold value related to the first interference detection operation and the fourth threshold value related to the second interference detection operation.

When the interference (first interference or second interference) is detected, based on the increased first threshold value or the fourth threshold value, the processor 160 may minimize power consumption used for interference detection of the electronic device, by detecting only interference (first interference or second interference) having a stronger intensity than interference (first interference or second interference) detected in a normal mode.

For example, as the state of the electronic device is determined as the battery saving mode, the processor 160 may increase the second and third threshold values related to the first whitening validation operation and the fifth and sixth threshold values related to the second whitening validation operation.

When the first whitening validation and the second whitening validation are performed, based on the increased second and third threshold values or the fifth and sixth threshold values, the processor 160 may determine whether to perform the whitening filtering in a more strict manner than the whitening validation performed in the normal mode. Accordingly, unnecessary whitening filtering may be prevented, and the whitening filtering may be efficiently performed considering the performance of the electronic device.

The processor 160 may maintain the first through sixth threshold values (S840). When the identified remaining battery charge is equal to or greater than the preset seventh threshold value, the processor 160 may determine the internal state of the electronic device as the normal mode.

For example, as the state of the electronic device is determined as the normal mode, the processor 160 may maintain the first threshold value related to the first interference detection operation and the fourth threshold value related to the second interference detection operation.

For example, as the state of the electronic device is determined as the normal mode, the processor 160 may maintain the second and third threshold values related to the first whitening validation operation and the fifth and sixth threshold values related to the second whitening validation operation.

Accordingly, as illustrated in FIG. 8, the electronic device according to example embodiments may perform adaptive whitening filtering by changing threshold values related to the interference detection and the whitening validation according to the performance (for example, remaining battery charge) or an operation mode (for example, a battery saving mode).

FIGS. 9A, 9B, 9C, 9D and 9E illustrate performance comparison results of the wireless communication device, to which the whitening filtering has been adaptively applied, according to example embodiments, respectively.

In FIGS. 9A, 9B, 9C, 9D and 9E, thin lines represent measurement results of communication performance according to an algorithm (hereinafter, a first algorithm), which forcibly performs whitening filtering on all RBs, and thick lines represent measurement results of communication performance according to an algorithm (hereinafter, a second algorithm), which skips all of the whitening filtering. In addition, dashed lines represent measurement results of communication performance according to an operation algorithm (hereinafter, an interference processing algorithm) according to example embodiments. In this case, the measured communication performance may indicate a block error rate (BLER) according to a signal-to-noise ratio (SNR).

Figure 9A:
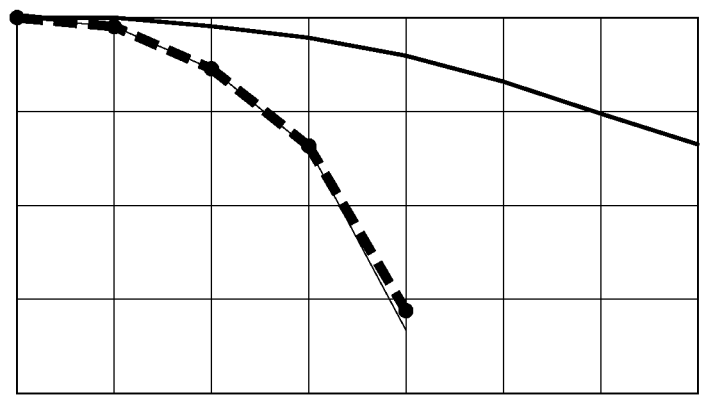
FIGS. 9A, 9B, 9C, 9D and 9E illustrate performance comparison results of wireless communication devices, to which whitening filtering is adaptively applied, according to example embodiments.

Referring to FIG. 9A, when there is the first interference in all the RBs of a system bandwidth, it may be identified that the interference processing algorithm according to example embodiments results in almost identical wireless communication performance to the first algorithm, by undergoing the first whitening validation and performing the whitening filtering.

In this manner, it may be identified that the detection operation on the first interference by the interference processing algorithm according to example embodiments properly works to achieve the detection operation, without omitting the RBs including the first interference.

Figure 9B:
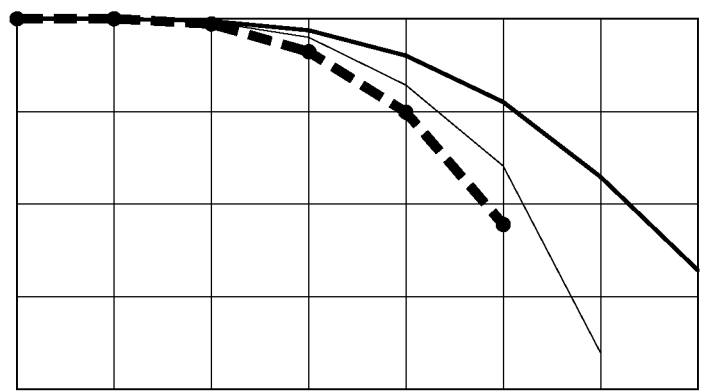

Referring to FIG. 9B, when there is the first interference in some RBs of the system bandwidth, it may be identified that the interference processing algorithm according to example embodiments results in improvement in the communication performance with respect to the first algorithm and the second algorithm, by passing through the first whitening validation and performing the whitening filtering only on the RBs including the first interference.

In this manner, it may be identified that the interference processing algorithm according to example embodiments has an effect of considerably improving wireless communication performance, by performing the selective whitening filtering on the RBs including the first interference.

Figure 9C:
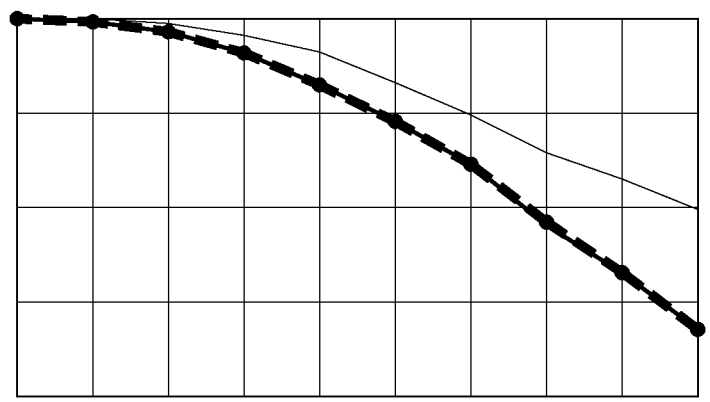

Referring to FIG. 9C, when there is the first interference in some RBs of the system bandwidth, it may be identified that the interference processing algorithm according to example embodiments results in almost identical wireless communication performance to the second algorithm, by not undergoing the first whitening validation and skipping the whitening filtering.

In this manner, by using the interference processing algorithm according to example embodiments, it may be identified that, when the performance degradation of the device is greater from the standpoint of the system overload (or complexity) even when the RBs including the first interference are detected, the whitening process on the interference is adaptably possible depending on a situation by passing through the first whitening validation and skipping the whitening filtering.

Figure 9D:
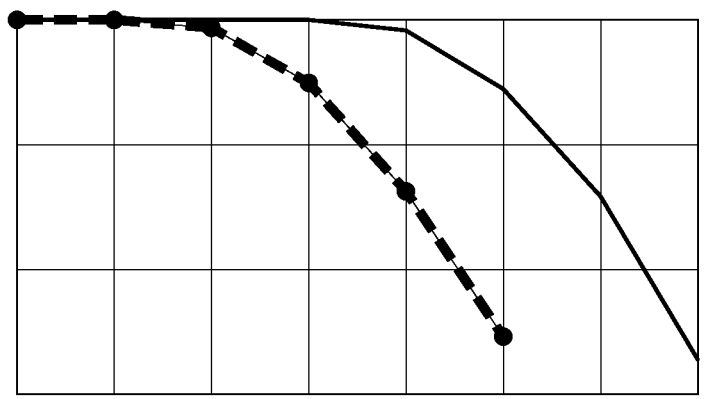

Referring to FIG. 9D, when there is the second interference in all the RBs of the system bandwidth, it may be identified that the interference processing algorithm according to example embodiments results in almost identical wireless communication performance to the first algorithm, by undergoing the second whitening validation and performing the whitening filtering.

In this manner, it may be identified that the detection operation on the second interference by the interference processing algorithm according to example embodiments properly works to achieve the detection operation, without omitting the RBs, in which the second interference has been detected.

Figure 9E:
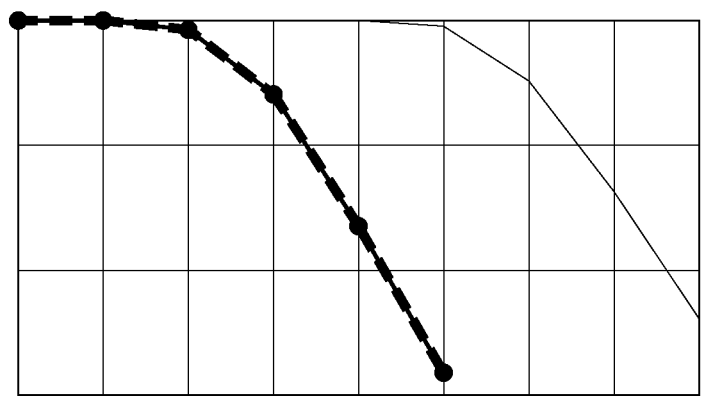

Referring to FIG. 9E, when there is the second interference in some RBs of the system bandwidth, it may be identified that the interference processing algorithm according to example embodiments results in almost identical wireless communication performance to the second algorithm, by not passing through the second whitening validation and skipping the whitening filtering.

In this manner, by using the interference processing algorithm according to example embodiments, it may be identified that, when the performance degradation of the device is greater from the standpoint of the system overload (or complexity) even when the RBs including the second interference are detected, the whitening process on the interference is adaptably possible depending on a situation by passing through the second whitening validation and skipping the whitening filtering.

Figure 10:
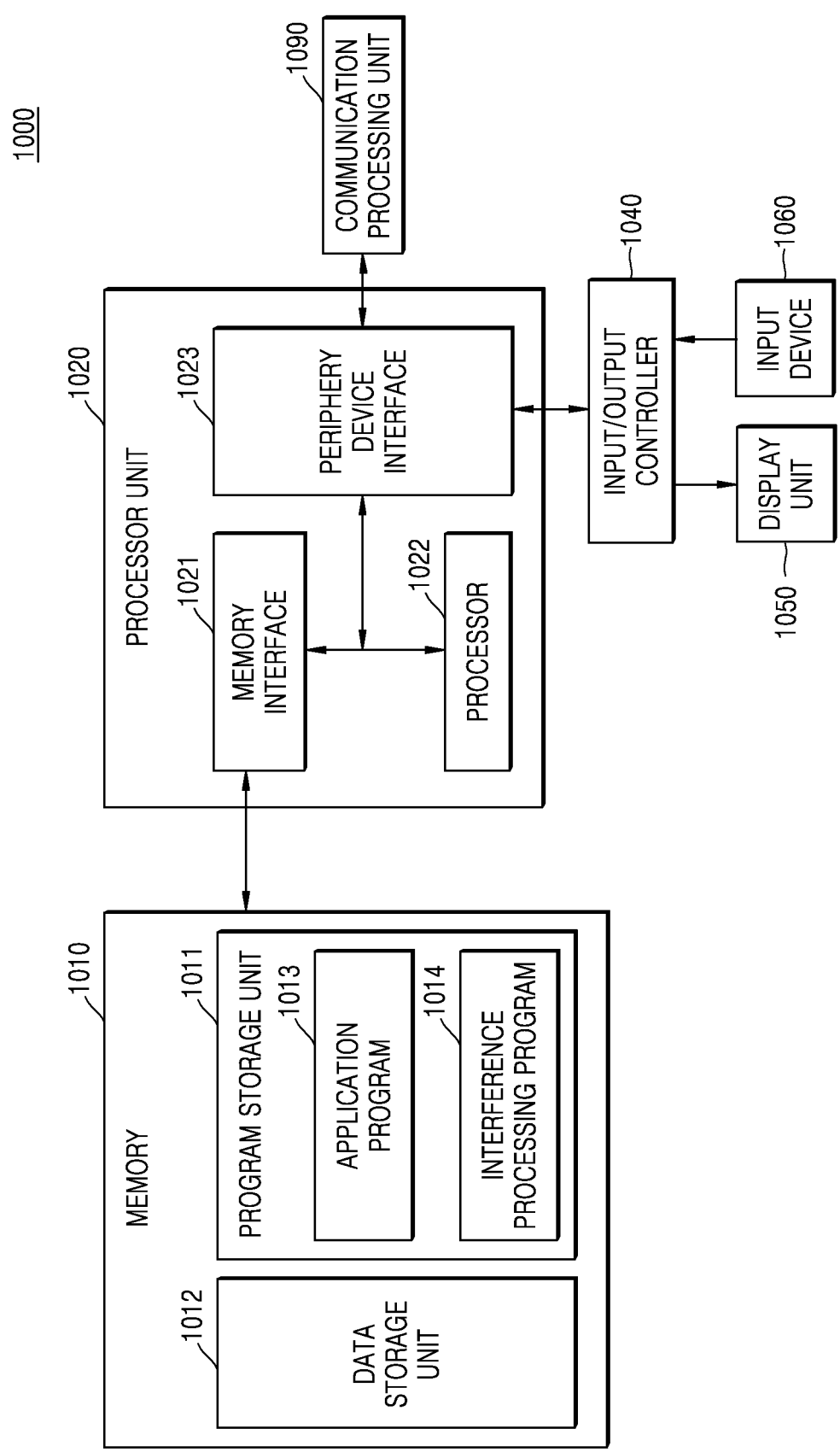
FIG. 10 is a block diagram of an electronic device according to an example embodiment.

FIG. 10 is a block diagram of an electronic device 1000 according to an example embodiment.

FIG. 10 is a block diagram of the electronic device 1000 according to an example embodiment. The electronic device 1000 may include a user device according to an example embodiment.

Referring to FIG. 10, the electronic device 1000 may include a memory 1010, a processor unit (e.g., processor circuit) 1020, an input/output controller 1040, a display unit (e.g., a display device) 1050, an input device 1060, and a communication processing unit (e.g., a communication processor) 1090. In this case, the memory 1010 may be plural. Components are as follows.

The memory 1010 may include a program storage unit (e.g., a first memory) 1011 for storing programs for controlling an operation of the electronic device 1000 and a data storage unit (e.g., a second memory) 1012 for storing data generated during program execution. The data storage unit 1012 may store data necessary for operations of an application program 1013 and an interference processing program 1014, or may store data generated from operations of the application program 1013 and the interference processing program 1014. The data storage unit 1012 may store information about threshold values related to the detection operation, the first whitening validation operation, and the second whitening validation operation on the interference (for example, the first interference or second interference), according to example embodiments. In addition, the data storage unit 1012 may store information about the threshold value of the remaining battery charge of the electronic device 1000, for interference processing, based on the performance of the electronic device 1000.

The program storage unit 1011 may include the application program 1013 and the interference processing program 1014. In this case, programs included in the program storage unit 1011 may include combinations of instructions, and may also be expressed as an instruction set. The application program 1013 may include program code for performing various applications executed by the electronic device 1000. In this regard, the application program 1013 may include code (or, commands) related to various applications executed by the processor 1022.

The interference processing program 1014 may include code (or commands) for detecting the first interference or the second interference, performing the whitening validation on whether to perform the whitening filtering on the detected first interference or the detected second interference, and performing the whitening filtering, based on the whitening validation. The processor 1022 may perform the interference detection operation, the whitening validation operation, and the whitening filtering operation described above by executing the interference processing program 1014.

On the other hand, the electronic device 1000 may include the communication processing unit 1090, which performs communication functions for voice communication and data communication. A periphery device interface 1023 may control connection between the input/output controller 1040, the communication processing unit 1090, the processor 1022, and a memory interface 1021. The processor 1022 may control the plurality of base stations BS to provide an applicable service by using at least one software program. In this case, the processor 1022 may execute at least one program stored in the memory 1010 to provide a service corresponding to an applicable program.

The input/output controller 1040 may provide an interface between an input/output device such as the display unit 1050 and the input device 1060 and the periphery device interface 1023. The display unit 1050 may display state information, input characters, moving pictures, still pictures, etc. For example, the display unit 1050 may display information about an application program executed by the processor 1022.

The input device 1060 may provide input data generated by a selection of the electronic device 1000 to the processor unit 1020 via the input/output controller 1040. In this case, the input device 1060 may include a keypad including at least one hardware button and a touchpad for sensing touch information. For example, the input device 1060 may provide via the input/output controller 1040 the touch information such as a touch, a touch movement, and a touch release, which have been sensed by the touch pad, to the processor 1022.

While aspects of example embodiments have been particularly shown and described, it will be understood that various changes in form and details may be made without departing from the spirit and scope of the following claims.

What is claimed is:
1. A wireless communication device comprising:
  a communication circuit configured to transceive a signal using a plurality of antennas;
  a processor configured to:
    detect a first interference for N resource blocks (RB) of the signal;
    based on the first interference being detected, perform a first whitening validation on the first interference;
    detect a second interference based on a result of the first whitening validation; and
    based on the second interference being detected, perform a second whitening validation on the second interference; and a whitening filter circuit configured to perform whitening filtering on results of the first whitening validation and the second whitening validation.

2. The wireless communication device of claim 1, wherein the first interference comprises spatially correlated interference, and
wherein the second interference comprises frequency selective interference.

3. The wireless communication device of claim 1, wherein the processor is further configured to detect the first interference based on a maximum value of a ratio of a cross-correlation value with respect to an auto-correlation value caused by different antennas among the plurality of antennas being equal to or greater than a preset first threshold value.

4. The wireless communication device of claim 1, wherein the processor, to perform the first whitening validation, is further configured to, determine to perform the whitening filtering on each of the N RBs based on the first interference being detected in each of the N RBs.

5. The wireless communication device of claim 1, wherein the processor, to perform the first whitening validation, is further configured to determine to skip the whitening filtering for a group of RBs, in which the first interference has not been detected, among the N RBs, based on an average noise power ratio of the RBs, in which the first interference has been detected, with respect to the RBs, in which the first interference has not been detected, being equal to or greater than a second threshold value, or a ratio of the RBs, in which the first interference has been detected, with respect to the N RBs being equal to or greater than a third threshold value.

6. The wireless communication device of claim 5, wherein the processor, to detect the second interference, is further configured to detect the second interference based on a normalized noise power variance value for the group of RBs exceeding a fourth threshold value.

7. The wireless communication device of claim 6, wherein the processor, to perform the second whitening validation, is further configured to determine to perform the whitening filtering on the group of RBs based on the normalized noise power variance value of the group of RBs exceeding a fifth threshold value, or a maximum difference value of an average noise power of antennas, among the plurality of antennas, measured for each of the group of RBs exceeding a sixth threshold value.

8. An operating method of a wireless communication device including a plurality of antennas configured to transceive a signal, the operating method comprising:
detecting a first interference for N resource blocks (RB) of the signal;
based on the first interference being detected, performing a first whitening validation on the first interference;
detecting a second interference, based on a result of the first whitening validation;
based on the second interference being detected, performing a second whitening validation on the second interference; and
performing whitening filtering according to results of the first whitening validation and the second whitening validation.

9. The operating method of claim 8, wherein the first interference comprises spatially correlated interference, and the second interference comprises frequency selective interference.

10. The operating method of claim 8, further comprising detecting the first interference based on a maximum value of a cross-correlation value with respect to an auto-correlation value caused by different antennas among the plurality of antennas exceeding a preset first threshold value.

11. The operating method of claim 8, wherein the performing the first whitening validation comprises determining that the whitening filtering is to be performed on the each of the N RBs based on the first interference being detected in each of the N RBs.

12. The operating method of claim 8, wherein the performing of the first whitening validation comprises, determining to skip the whitening filtering for a group of RBs, in which the first interference has not been detected, among the N RBs, based on an average noise power ratio of the RBs, in which the first interference has been detected, with respect to the RBs, in which the first interference has not been detected, being equal to or greater than a second threshold value, or a ratio of the RBs, in which the first interference has been detected, with respect to the N RBs being equal to or greater than a third threshold value.

13. The operating method of claim 12, wherein the detecting of the second interference comprises detecting the second interference based on a normalized noise power variance value of the group of RBs exceeding a fourth threshold value.

14. The operating method of claim 13, wherein the performing of the second whitening validation comprises, determining to perform the whitening filtering on the group of RBs based on the normalized noise power variance value of the group of RBs exceeding a fifth threshold value, or a maximum difference value of an average noise power of antennas, among the plurality of antennas, measured for each of the group of RBs exceeding a sixth threshold value.

15. An electronic device comprising:
a communication circuit configured to transceive a signal using a plurality of antennas;
a processor configured to:
detect a first interference for N resource blocks (RB) of the signal;
based on the first interference being detected, perform a first whitening validation on the first interference;
detect a second interference, based on a result of the first whitening validation; and
based on the second interference being detected, perform a second whitening validation on the second interference;
a whitening filter circuit configured to perform whitening filtering according to results of the first whitening validation and the second whitening validation; and
a whitening control circuit configured to change at least one threshold value related to detection of the first interference and the second interference, based on a remaining battery charge of the electronic device, the first whitening validation, and the second whitening validation.

16. The electronic device of claim 15, wherein the processor is further configured to, detect the first interference based on a maximum value of a ratio of a cross-correlation value with respect to an auto-correlation value caused by different antennas among the plurality of antennas being equal to or greater than a preset first threshold value.

17. The electronic device of claim 16, wherein, for performing the first whitening validation, the processor is further configured to determine to skip the whitening filtering for a group of RBs, in which the first interference has not been detected, among the N RBs, based on an average noise power ratio of between the RBs, in which the first interference has been detected, with respect to and the RBs, in which the first interference has not been detected, being equal to or greater than a second threshold value, or a ratio of the RBs, in which the first interference has been detected, with respect to the N RBs being equal to or greater than a third threshold value.

18. The electronic device of claim 17, wherein, for detecting the second interference, the processor is further configured to detect the second interference based on a normalized noise power variance value of the group of RBs exceeding a fourth threshold value.

19. The electronic device of claim 18, wherein, for performing the second whitening validation, the processor is further configured to determine to perform the whitening filtering on the group of RBs based on the normalized noise power variance value of the group of RBs exceeding a fifth threshold value, or a maximum difference value of an average noise power of antennas, among the plurality of antennas, measured for each of the group of RBs exceeding a sixth threshold value.

20. The electronic device of claim 19, wherein the whitening control circuit is further configured to, based on the remaining battery charge of the electronic device being less than a preset value, increase the at least one threshold value, and wherein the processor is further configured to, based on the at least one threshold value being increased, re-determine whether to perform the whitening filtering on the N RBs.

* * * * *